United States Patent [19]

Kramer et al.

[11] 4,115,802
[45] Sep. 19, 1978

[54] OPTICAL-ELECTRONIC MICROSCOPY APPARATUS AND PROCESS

[75] Inventors: Klaus Kramer, Giessen; Toni Dietrich, Wetzlar; Peter Braun, Krofdorf-Gleiberg, Germany

[73] Assignee: Wilhelm Will KG, Nauborn, Germany

[21] Appl. No.: 603,238

[22] Filed: Aug. 8, 1975

[30] Foreign Application Priority Data

Aug. 7, 1974 [DE] Fed. Rep. of Germany ....... 2437984

[51] Int. Cl.² ............................................. H04M 7/00
[52] U.S. Cl. ..................................... 358/93; 358/106; 358/107; 358/110; 250/311
[58] Field of Search ............ 178/6.5, DIG. 1, DIG. 5, 178/DIG. 8, 6.8, DIG. 37; 250/311, 305; 358/107, 106, 110, 225, 93; 350/130, 131, 8; 35/88

[56] References Cited

U.S. PATENT DOCUMENTS

| | | | |
|---|---|---|---|
| 3,327,119 | 6/1967 | Kamentsky | 250/461 B |
| 3,497,690 | 2/1970 | Wheeless | 250/71 |
| 3,684,377 | 8/1972 | Adams | 250/83.3 UV |
| 3,696,249 | 10/1972 | Bowker | 250/220 |
| 3,862,356 | 1/1975 | Olson | 178/6.8 |
| 3,883,247 | 5/1975 | Adams | 250/484 |
| 3,887,812 | 6/1975 | Hirschfeld | 250/461 B |
| 3,916,197 | 10/1975 | Fulwyler | 250/461 |

FOREIGN PATENT DOCUMENTS 1,062,163  3/1967  United Kingdom ...................... 250/461

*Primary Examiner*—Robert L. Griffin
*Assistant Examiner*—Edward L. Coles
*Attorney, Agent, or Firm*—Edmund M. Jaskiewicz

[57] ABSTRACT

An apparatus and process for microscopy produces two real images of a specimen using light-optical means. The images have different light qualities and are then amplified electronically and rendered visible as a single image following a difference image method.

24 Claims, 5 Drawing Figures

OPTICAL-ELECTRONIC MICROSCOPY APPARATUS AND PROCESS

The present invention relates to microscopy, more particularly, to an apparatus and process for observing dynamic phenomena in living specimens that are no longer visible through light-optical means because of insufficient optical-resolving power, and/or lack of contrast.

The recognition of detail in specimens depends substantially on the resolving power of the microscope which is used. When normal light is employed, the resolving power is situated approximately at 280 nm, while with the use of ultraviolet light such power is situated at about 140 nm, i.e., the details having smaller dimensions are no longer recognizable with an optical microscope.

Moreover, the recognition of detail is a function of the attainable contrast, especially in the case of amplitude objectives. The contrast can be improved by using dark-field, phase-contrast, interference-contrast, polarization or fluorescence microscopy. Staining methods are preferred in the case of biological specimens. However, staining is time-consuming and in many cases it causes damage or even death to the specimen.

When electron microscopes are used, the power of resolution can be increased substantially. However, such microscopes do not permit obtaining a contrast on the living specimen, on the one hand, and, on the other hand, living biological specimens cannot endure the electronic bombardment in vacuo.

Moreover, the preparation of specimens for an electron microscope is very expensive. The thickness of the prepared specimen may not exceed 100 nm, so that very fine cuts must be made. Working with electron microscopes thus requires extensive, long-lasting and costly preliminary steps of preparation, such as fixing, embedding of the specimen, preparation of ultramicrotome cuts and contrasting of the specimen being prepared.

If it should be desired to observe under a microscope the fine structure of a cell and its organellas, i.e., plasma membranes, endoplasmatic reticulum and ribosomes, dictyosomes and golgi apparatus, cytosomes, mitochondria, plastides, centriols and nudeolus, the magnification of an optical microscope is not sufficient but, on the other hand, the organellas would remain alive under purely optical observation. If an electron microscope is used, it is possible to recognize such organellas and, therewith, the fine structure of many cell types. However, the organellas die together with the cell. Consequently, by using an electron microscope one can fundamentally make only statements concerning the statics and not concerning the genesis and dynamics of a cell.

It is the principal object of the present invention to provide a process and apparatus wherein the specimens remain alive and can yet be observed with sufficient resolving power and sufficient contrast.

According to one aspect of the present invention two real images of the specimen are produced using light-optical means. These images have different light qualities and are amplified electronically and then rendered visible as a single image in accordance with the difference-image method.

It is apparent that with this invention the specimens to be observed no longer come in contact with electron beams, i.e., the specimens remain alive, since images of the specimen are produced by purely optical means. However, because of the electronic effect exerted on the optically produced images, the total magnification is increased approximately by the factor of 10 in comparison with optical microscopes. An electronic amplification of the modulation-transmission function at higher local frequencies of the images is possible in spite of the optically limited resolving power, since the modulation-transmission function of the light microscope decreases with respect to the local frequency asymptotically toward zero, i.e., a residual resolution of the microscope is still continually present. At the same time, this process and apparatus makes it possible to produce well-contrasted images of the specimen.

The specimen can be transilluminated or subjected to top light and, especially, also to ordinary light, in which connection one can apply the above-mentioned methods for increasing the contrast.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views, the specific embodiment and modifications of the present invention will be described in detail.

Figure 1:
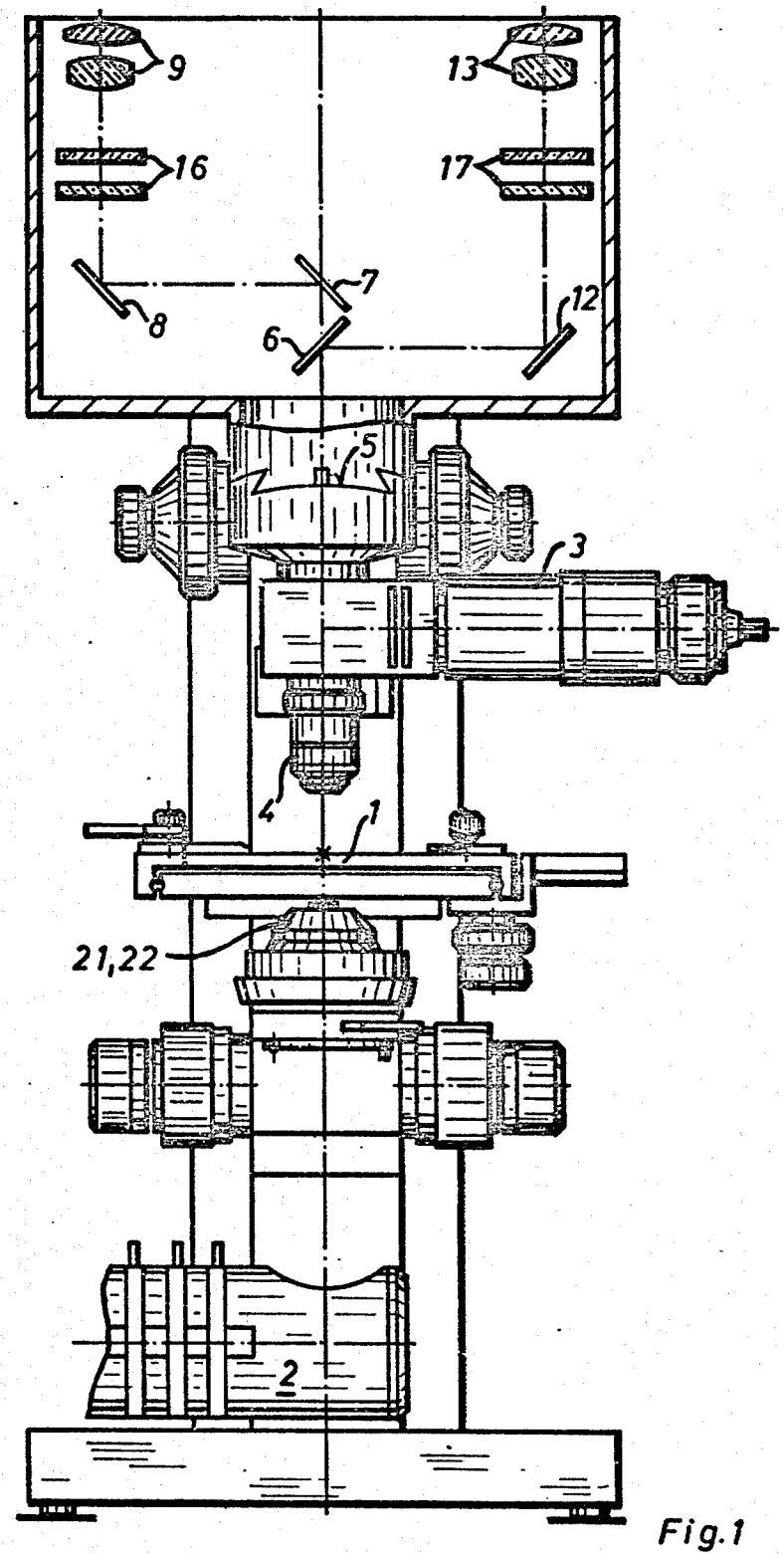
FIG. 1 is an elevational view of the optical portion of the apparatus, partially in section.
Figure 3:
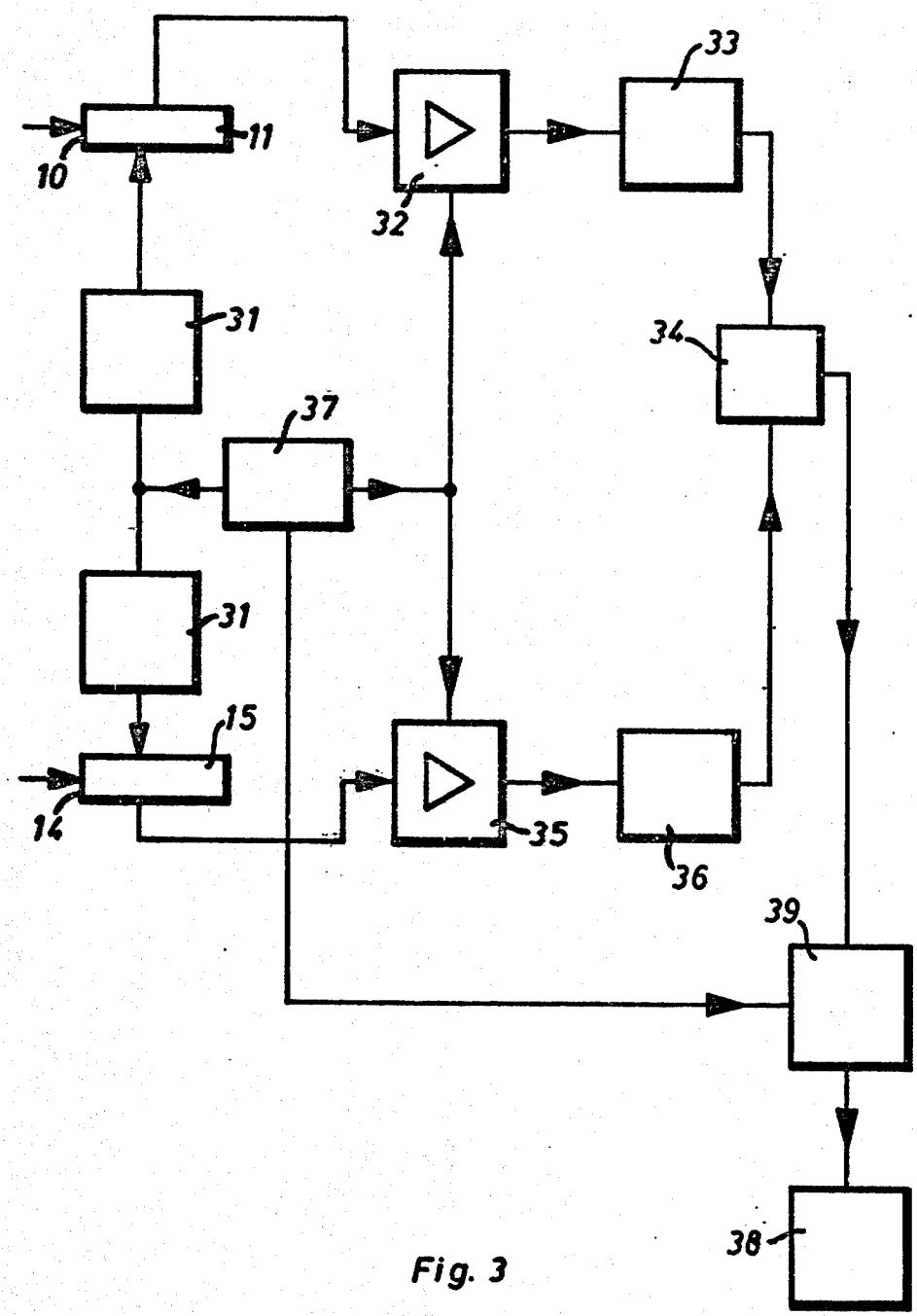
FIG. 3 is a block diagram showing schematically the electronic portion of the apparatus.

According to FIG. 1, a specimen 1 is illuminated wither by means of a light source 2 in transillumination or by means of a light source 3 in top light. An image-forming objective 4 is inserted into the apparatus by means of a dovetail guide 5, so that it can be replaced. A partly translucent mirror 6 follows objective 4. Mirrors 7 and 8 guide the light rays passed by the partly translucent mirror into a projecting arrangement 9, which produces a real image of the specimen on the light-sensitive layer of a camera tube 11 (FIG. 3). The rays deflected on mirror 6 are guided by means of a mirror 12 and a projecting arrangement 13 to a light sensitive layer 14 of an iconoscope or vidicon 15 and produce a real image of the specimen therein. Elements 16 and 17, which change the quality of light, are inserted into the paths of partial beams. Such elements consist, for example, of differential light filters, when natural light is used, or polarizers, when polarized fluorescent light is used, or a demodulation device, e.g., a Pockel's cell for utilizing possibly differential fading periods of fluorescence, then irradiating with ultraviolet light. In the latter case, the applied ultraviolet light is modulated in dependence on time. The above-mentioned elements are arranged with advantage on a slide or the like and selectively introduced into the microscope.

Figure 2:
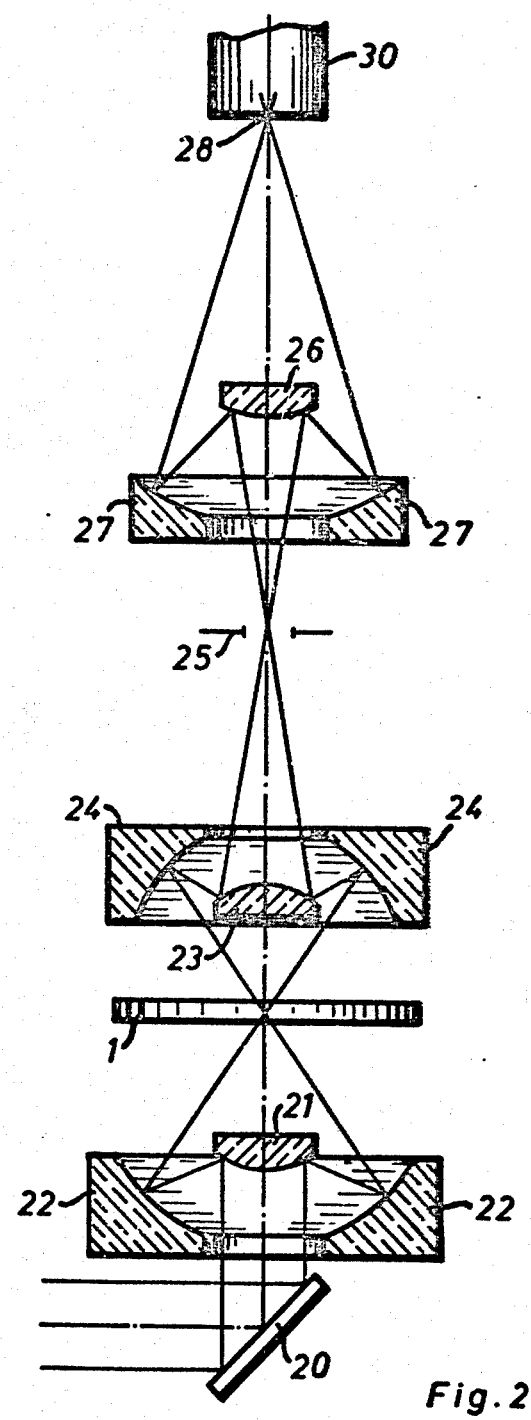
FIG. 2 is a schematic diagram showing the optical arrangement in the optical portion of the apparatus when using ultra-violet light.
Figure 4:
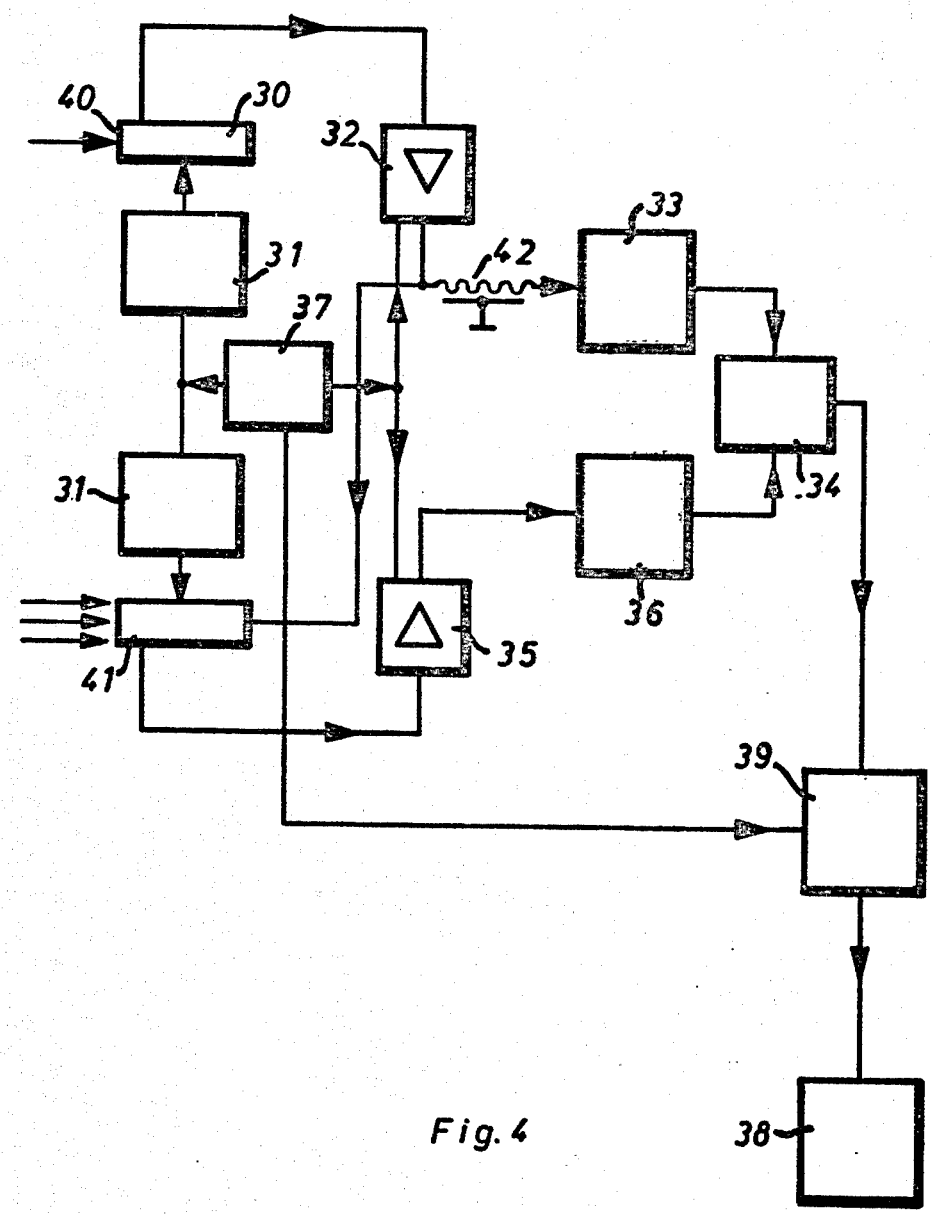
FIG. 4 is a view similar to that of FIG. 3 but showing a modification thereof.

FIG. 2 shows the optical path of rays for producing an image when using ultra-violet (UV) light. The UV-light is supplied by means of a mirror 20 to a condenser consisting of mirrors 21 and 22. Specimen 1 is illuminated by means of the condenser. The objective consists likewise of mirrors 23 and 24. It produces an intermediate image in a plane 25. Objective 23/24 may be followed by the image-dividing mirror 6 of FIG. 1. However, in the present case only one image of the specimen is to be produced. The real image produced in plane 25 of intermediate image is reproduced by means of a projecting arrangement consisting of mirrors 26 and 27 in an intermediate-image plane 28, wherein the light-sensitive layer of an iconoscope 30 is arranged (FIG. 4).

The use of ultraviolet light of suitable wavelength has certain advantages. Since the ultraviolet light possesses a shorter wavelength than the visible light, the resolving power is greater from the very beginning. However, in addition to this, the ultraviolet light introduces further substantial advantages.

The substance-specific portions of the absorption spectra comprising high extinction are situated in the UV range and not in the visible range, where one can find only the long-wave offshoots of low extinction possessing a small degree of specificity in regard to substance. Consequently, the images of living cells produced with ultraviolet light by transillumination method are substantially richer in contrast than those produced with visible light. Besides, with suitable preliminary filtering of the transilluminating light, such images are specific in regard to substance for the various materials contained in the cell.

Secondly, the fluorescence of most luminescent materials contained in a cell can be stimulated only through ultraviolet light. Also this produces further possibilities of differentiation for the image-type separation of the various materials contained in a cell and, therewith, possibilities for obtaining new insight into the genesis and dynamics, biochemistry and energetics of the cell as well as the distribution of the metabolism to various reaction chambers and the conveying of the materials through the boundary surfaces of the cell.

However, the use of ultraviolet light does present the danger of breaking up the chemical bonds, especially those of low energy.

The further development of the invention meets this risk by maintaining the ratio of the output-signal intensity to the intensity of the applied light and the intensity of the stimulating light at the optimum level, preferably at the boundary of the quantum noise. When this condition is preserved, a low-intensity ultraviolet light can be used for producing an image of the specimen. Accordingly, there is no longer any fear of a wide breaking up of the chemical bonds. The term output-signal intensity is to indicate the intensity of light on the first light-sensitive layer of the electronic portion.

The observance of this condition was not customary in the microscopy art up to the present time, since the field of the quantum noise is not attained perhaps owing to the dark adaptation of the eye of the observer.

When the wavelength becomes smaller, an additional steeply increasing contrast-reducing scattering of the light takes place, which is ordinarily noticeable when ultraviolet light is used. The process of the invention suppresses this effect from the very beginning through the difference-image method which is applied anyhow.

For producing the difference image one can use initial images that exhibit differential wavelengths, differential fading periods of fluorescence or differential degrees of polarization.

According to FIG. 3, a scanning system 31 acts upon iconoscopes 11 and 15, so that the images produced on the light-sensitive layers are scanned synchronously and correctly in regard to the points and lines. The iconoscopes, or vidicons, may comprise a color television camera. The signals emitted by iconoscope 11 are introduced into an amplifier 32, which supplies the image output signals to a logarithm-forming device 33. The latter delivers its signals to a difference-forming device 34.

The signals generated by iconoscope 15 are supplied to an amplifier 35, which transmits its signals to a logarithm-forming device 36, whose signals are likewise supplied to difference-forming device 34. A synchronous generator 37 controls the synchronism of the signals. Since the quality of light differs for every image point on light-sensitive layers 10 and 14 of the iconoscopes, signals of different intensity reach difference-forming device 34, so that it is possible to form the signal differences for every scanned point.

The image output signals are introduced into a television monitor 38, which may be a black-and-white or color television receiver, so that its picture screen displays a contrast-rich difference image of the images produced on light-sensitive layers 10 and 14. In order to provide the synchronism of the difference-image producing signals with the scanning signals in the television pick-up cameras, synchronous generator 37 acts on a corresponding control device 39 associated with the TV monitor.

FIG. 4 shows a modified device which can be used, for example, in connection with the beam guide of FIG. 2. A real image of the specimen is produced on a light-sensitive layer 40 of iconoscope 30. A iconoscope 41 is subjected to constant light. Since the signals here traverse difference distances, a delay line 42 is placed in front of logarithm-forming device 33 of FIG. 4, so that difference-forming device 34 can again perform precisely the subtraction of the separate signals from one another. Amplifier 32 controls the electron beam of camera tube 41. Moreover, the electron beam of this camera tube is held out of focus through defocussing, so that an out-of-focus charge pattern is obtained on the rear side of the storage plate of iconoscope 32, which pattern can be subtracted from the charge pattern of iconoscope 40.

Figure 5:
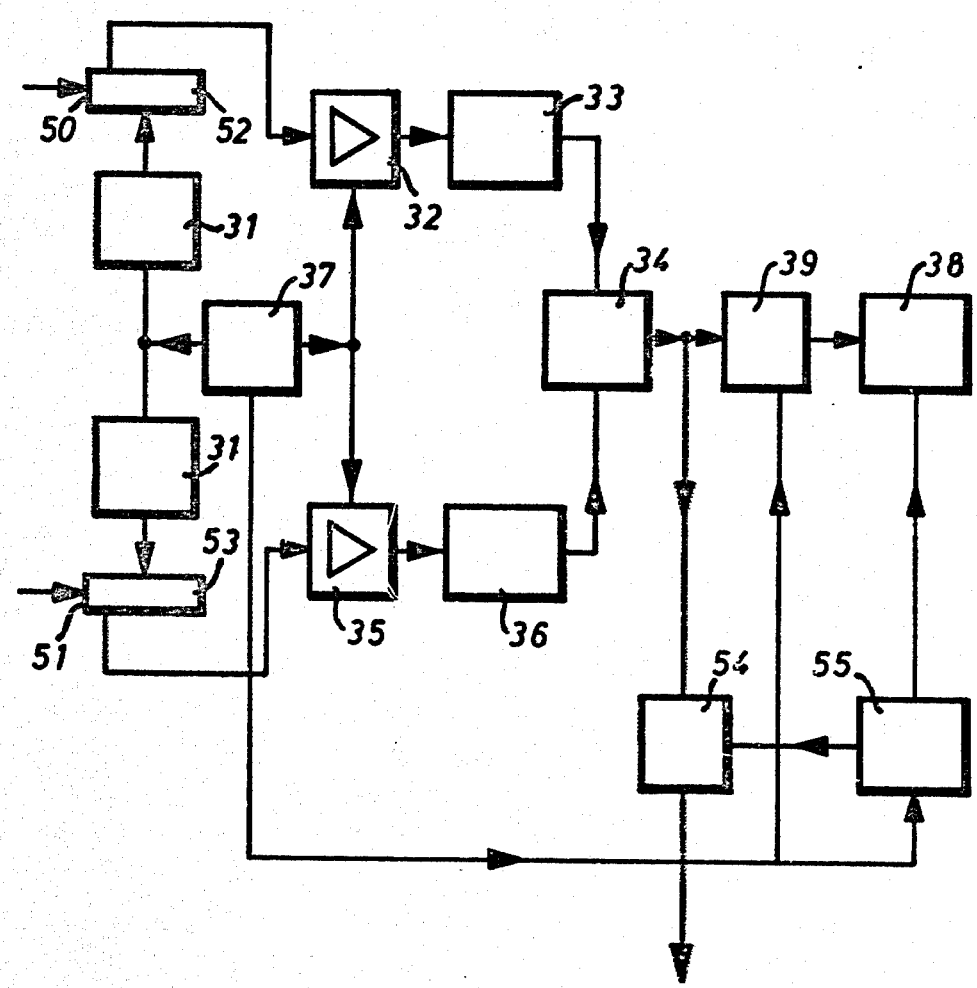
FIG. 5 is a view similar to that of FIG. 3 and showing a further modification thereof.

FIG. 5 shows the invention in the form of densitometer. Measured images of the specimen are produced on light-sensitive layers 50 and 51 of iconoscopes 52 and 53 and scanned just as described above. The signals leaving device 34 for difference-forming are given, on the one hand, again to device 39 and, from there, to TV monitor 38, and, on the other hand, into a gate 54, which is controlled simultaneously by a window generator 55. The signals delivered by the gate may, for example, be registered and stored in an electric data processing device or even introduced into a recording system or the like, from which the data are printed out.

The iconoscopes are firmly attached to the optical portion of the apparatus, in order to avoid relative displacements of the images on the light-sensitive layers when the apparatus is shaken.

The entire system, consisting of the optical and the electronic portion, is conceived as an "optical all-pass." Because of this, it is possible to maintain constant the product of the modulation-transmission function of the optical portion and the modulation-transmission function of the electronic portion dependent upon the local frequency through a wider range of local frequency than merely in the optical portion, i.e., the entire system has a constant modulation transmission function for the local frequency range under consideration.

Iconoscopes or vidicons are employed for scanning the real images produced by the optical microscope portion, the real microscope images being produced on the light-sensitive layers of such tubes.

In particular cases it is sufficient to produce optically a single image on the light-sensitive layer of an iconoscope and to subject the light-sensitive layer of the other iconoscope to constant light. The electron beam of this iconoscope is controlled by the video signal of the second iconoscope. The electron beam is further kept out of focus in relation to normal operation, thus producing an unfocussed charge pattern on the back side of the storage plate. If its video signal is subtracted from that of the iconoscope under normal operation, there is obtained an electronic system comprising high-pass properties. The high pass follows the optical low pass. With suitable dimensioning of the electronic portion, the two produce jointly a total system comprising all-pass properties in a wider range of local frequency.

The difference image is preferably produced on the picture screen of a TV monitor. This improves perhaps the diagnostic reliability through fatique-free working in a cytological laboratory.

Besides, the capability of evaluating the microscope image can be improved additionally through the adjustability of contrast and brightness on the TV monitor, so that there is obtained an increase in the recovered information.

The described device can be used with advantage also for the densitometry, i.e., for detecting, identifying and quantitatively measuring very small amounts of substances.

If the fading periods of fluorescence of the materials contained in cells are used, the stimulating light is time-modulated with advantage and the fluorescence is demodulated in connection with simultaneous phase shift.

The described process is also suitable for the data-type determination of images or parts thereof and for storing such data, in which connection one may also use the time-lapse technique, such as for examining the dynamics of cells.

The described process is suitable especially for the early cytological cancer diagnosis in connection with the regular examination of wide groups of population, particularly in association with the above-mentioned electronic storage and processing of data obtained from the microscopic results.

It will be understood that this invention is susceptible to modification in order to adapt it to different usages and conditions, and accordingly, it is desired to comprehend such modifications within this invention as may fall within the scope of the appended claims.

What is claimed is:

1. A process for increasing the magnification of an optical electronic microscope together with increasing the resolving power to observe dynamic phenomena in living specimens which are not visible through light optical means due to insufficient optical resolving power, comprising the steps of producing by light optical means on two iconoscopes two real images of different light qualities of a specimen, scanning point by point in synchronism the two real images on the two iconoscopes and amplifying electronically both of the scanned real images, and forming by logarithmic difference a single visible image from the two amplified real images such that separate cell structures are visible in the image.

2. A process as in claim 1 wherein ultraviolet light is used for the light-optical image-forming of the specimen.

3. A process as in claim 2 wherein the real images are produced by the fluorescence method, the ultraviolet light is time-modulated and the formed fluorescent light is demodulated in connection with simultaneous phase shift.

4. A process as in claim 1 wherein the ratio of the output-signal intensity to the intensity of the used light and the intensity of the stimulating light are maintained at the boundary of the quantum noise.

5. A process as in claim 1 wherein the product of the modulation-transmission function during the optical image-forming and the modulation-transmission function during the electronic amplification is maintained constant dependent on the local frequency through a wide range of local frequency.

6. A process as in claim 1 wherein the optically produced real images differ through one of differential wavelengths, and fading periods of fluorescence and degree of polarization.

7. A process as in claim 1 wherein the real images of the specimen are produced by one of light-field, dark-field, phase-contrast, interference-contrast and fluorescence methods.

8. A process as in claim 1 wherein the light-optically produced images are projected on the light-sensitive layers of two iconoscopes.

9. A process as in claim 8 wherein one image is produced through light-optical means on the light-sensitive layer of one iconoscope and the light-sensitive layer of the other iconoscope is subjected to constant light, the electron beam which scans the light-sensitive layer is controlled by the iconoscope which receives the real image and is intentionally held out of focus through defocussing.

10. A process as in claim 1 wherein the difference image is produced on the picture screen of a television monitor.

11. A process as in claim 1 wherein the difference image or portions thereof are in the form of data which can be stored.

12. A process as in claim 1 wherein separate images or portions thereof are stored and reproduced by the time-lapse process.

13. An apparatus for increasing the magnification together with increasing the resolving power to observe dynamic phenomena in living specimens which are not visible through light optical means due to insufficient optical resolving power, comprising a light optical microscope having an objective, partially translucent mirror means in the path of light rays from the objective for dividing said light rays into two partial beams of light rays, light quality changing elements in at least one path of said two partial beams, a pair of iconoscopes each having a light sensitive surface to receive a partial beam from said light quality changing elements such that two real images are defined on the two light sensitive surfaces respectively, means connected to each of said iconoscopes for scanning in synchronism said two real images, electronic amplifier means connected to said iconoscopes for receiving said scanned two real images, and means connected to said amplifier means for producing a different image from said amplified images in such manner that separate cell structures are visible in the image.

14. An apparatus as in claim 13 and means for one of selective transilluminating and top-light illumination of a specimen.

15. An apparatus as in claim 13 wherein said light-optical microscope has means for producing at least one real intermediate image, means for projecting said intermediate image, and a light-sensitive layer of at least one iconoscope receiving the projected image.

16. An apparatus as in claim 13 wherein said microscope comprises a source of ultraviolet light and an optical mirror arrangement.

17. An apparatus as in claim 13, characterized in that one of the optically produced images is deliberately held out of focus.

18. An apparatus as in claim 13 wherein after the difference is formed, the image-output signal is supplied to a gate controlled by a window generator, said gate supplying the image signal of a portion of the total image adjustable on the window generator and additionally marked on the picture screen of a TV monitor to one of an electronic data processing device or a recording device.

19. An apparatus as in claim 13 wherein one of elements comprising color filters, polarization means or a device for the time intensity-modulation are provided in the paths of partial beams to exert an effect on the quality of the light.

20. An apparatus as in claim 19 wherein said effect exerting elements are arranged selectively in the paths of said partial beams.

21. An apparatus as in claim 13 wherein each iconoscope is followed by an amplifier, said amplifiers are each followed by a logarithm-forming device which generates signals, means receiving said signals for forming the difference of the signals, and a TV monitor following said difference forming means.

22. An apparatus as in claim 21 wherein the apparatus further comprises means for synchronizing the image-scanning beams in the camera tubes and the image-producing beams in the monitor.

23. An apparatus as in claim 13 wherein a single real image of the specimen is produced on one of said iconoscopes, the other of said iconoscopes being subjected to constant light, the electron beam which scans the light-sensitive layer of said other iconoscope being controlled by said other iconoscope and the charge pattern on the back side of the storage plate of said one iconoscope is deliberately held out of focus by the defocussing of the electron beam.

24. An apparatus as in claim 23 wherein a delay line is placed in front of a logarithm-forming means.

* * * * *